(12) United States Patent
Ho

(10) Patent No.: US 7,931,308 B2
(45) Date of Patent: Apr. 26, 2011

(54) SELF-CENTERING ADAPTER CLAMP

(76) Inventor: David Gian-Teh Ho, Diamond Bar, CA (US)

( * ) Notice: Subject to any disclaimer, the term of this patent is extended or adjusted under 35 U.S.C. 154(b) by 336 days.

(21) Appl. No.: 12/105,182

(22) Filed: Apr. 17, 2008

(65) Prior Publication Data

US 2008/0191473 A1    Aug. 14, 2008

Related U.S. Application Data

(63) Continuation-in-part of application No. 11/266,653, filed on Nov. 2, 2005, now Pat. No. 7,377,556.

(51) Int. Cl.
*F16L 19/00*    (2006.01)
(52) U.S. Cl. ............ 285/338; 285/346; 42/119; 359/829
(58) Field of Classification Search .................. 285/338, 285/382.5, 382.4, 346; 359/829; 42/119, 42/122
See application file for complete search history.

(56) References Cited

U.S. PATENT DOCUMENTS

| | | | | | |
|---|---|---|---|---|---|
| 2,817,142 | A | * | 12/1957 | Boden et al. | 285/346 |
| 3,058,391 | A | * | 10/1962 | Leupold | 359/422 |
| 3,610,666 | A | * | 10/1971 | Tyler | 285/346 |
| 3,696,516 | A | * | 10/1972 | Thompson | 42/119 |
| 7,203,006 | B2 | * | 4/2007 | Kuo | 359/829 |
| 7,441,810 | B2 | * | 10/2008 | Buff | 285/346 |

* cited by examiner

*Primary Examiner* — David E Bochna
(74) *Attorney, Agent, or Firm* — Christie, Parker & Hale LLP

(57) ABSTRACT

An adapter clamp for clamping an adapting tube. The adapter clamp includes: an adapter tube; a first resilient ring placed in the inner circumferential surface of the adapter tube and including elastic material for expanding inward and clamping to the outer surface of the adapting tube; a hollow adjustment ring configured to be threaded to the inner surface of the adapter tube to generate a displacement force; and a compression ring providing minimum friction resistant for translating the displacement force from the threading hollow adjustment ring to a longitudinal compressing displacement of the first resilient ring, causing an inner surface of the first resilient rings to fit to the outer surface of the adapting tube. The adapter clamp also includes a second resilient ring placed in the inner circumferential surface of the adapter tube; and a spacer placed on the inner circumferential surface of the adapter tube.

20 Claims, 10 Drawing Sheets

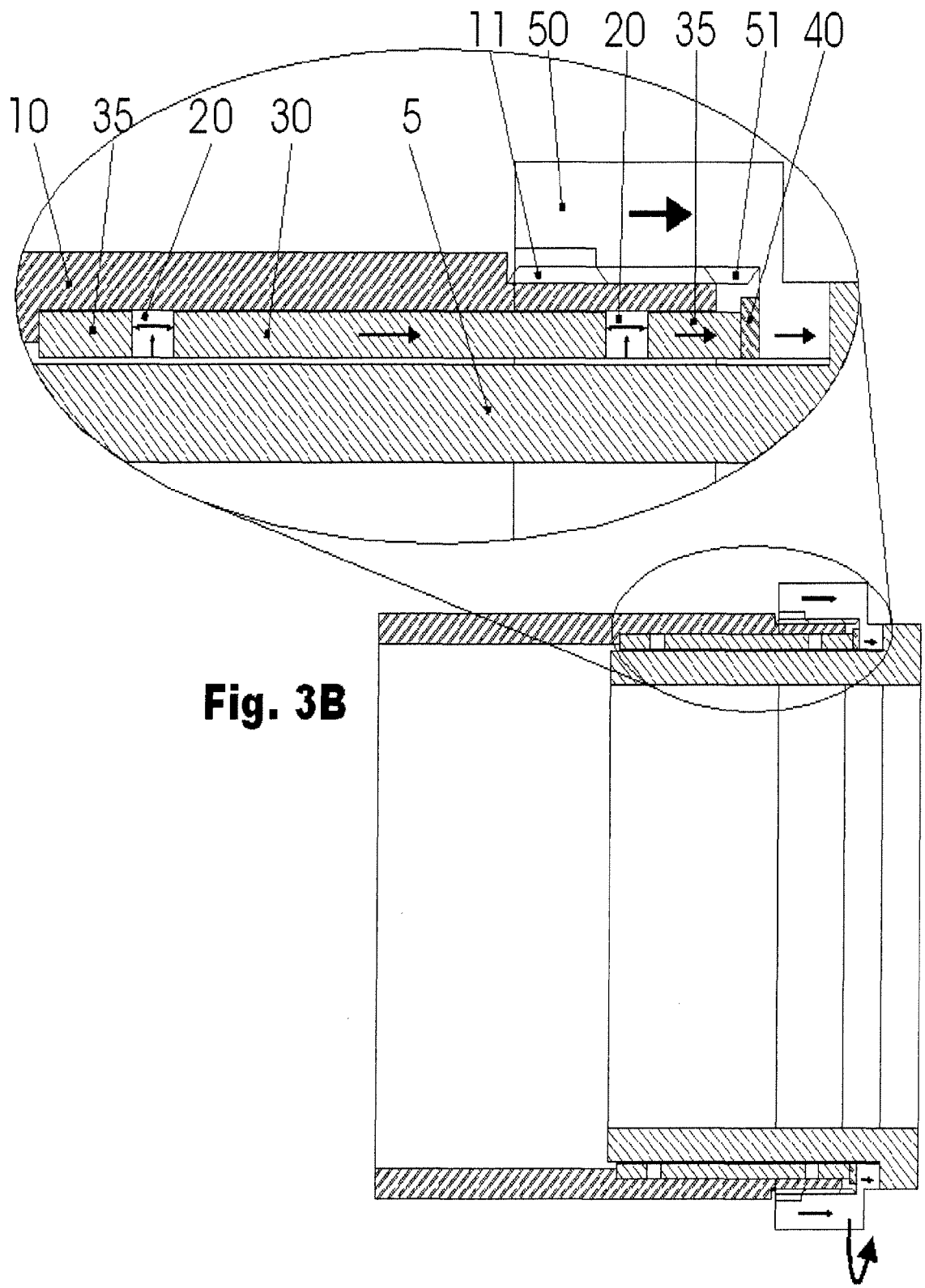

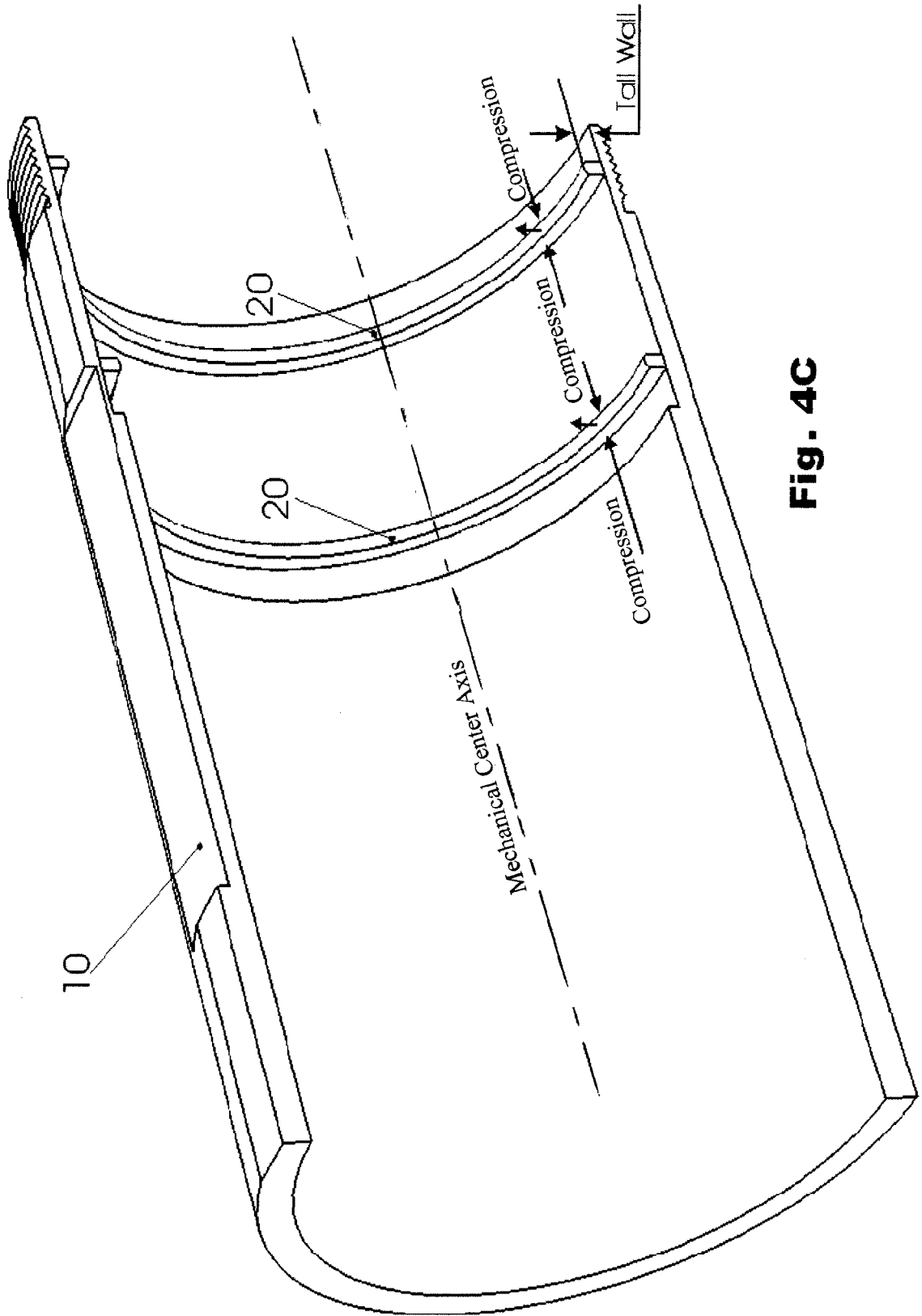

SELF-CENTERING ADAPTER CLAMP

CROSS REFERENCE TO RELATED APPLICATION(S)

This patent application is a Continuation-in-Part (CIP) of the U.S. patent application Ser. No. 11/266,653, filed Nov. 2, 2005 now U.S. Pat. No. 7,377,556 and entitled SELF-CENTERING ADAPTER, the contents of which are hereby expressly incorporated by reference.

FIELD OF THE INVENTION

The present invention relates to a quick and easy adapter mount, which clamps to and auto centers in an adapting tube.

BACKGROUND OF THE INVENTION

Accurately and quickly center fitting a tube or rod of another inserting tube (an adapting tube) has been a constant challenge for users in a variety of fields. A conventional way to accomplish this is to thread both the adapter and the adapting tube together to ensure the strength and centering of the fitting. However, this method requires time consuming threading action during loading and unloading process. In addition, different thread specifications for the adapter and the adapting tube from different manufactures give rise to compatibility problems.

The focuser draw tube of a telescope also have this problem. For example, the slop between an adapting laser collimator and the focuser draw tube exists in all telescope focusers due to manufacturing tolerances on the inside diameter of the focuser tube and the tolerances on the outside diameter of the adapting tube, namely laser collimator and eyepiece. In fact, just tightening with a conventional "set screw" on the telescope focuser can often offsets the inserted laser collimator from its intended optical center axis which renders the inserted device inaccurate. Other methods like uniform compression ring on the telescope focuser draw tube clamps the inserted eyepiece or laser collimator off centered with two linear clamping points causing the inserted laser collimator to pivot and results in inaccurate collimation. In short, any small mis-alignment of installed laser collimator in the focuser draw tube substantially affected accuracy in aligning optical components of a telescope.

Therefore, there is a need for a quick and easy clamping mechanism, which securely and accurately attaches to an adapting tube.

SUMMARY OF THE INVENTION

In one embodiment, the invention is an adapter clamp for clamping an adapting tube having an inner surface. The adapter clamp includes: an adapter tube having an inner circumferential surface; a first resilient ring placed in the inner circumferential surface of the adapter tube and comprising of elastic material for expanding inward and clamping to the outer surface of the adapting tube; a hollow adjustment ring configured to be threaded to the inner circumferential surface of the adapter tube to generate a displacement force; and a compression ring for translating the displacement force from the hollow adjustment ring to a longitudinal compressing displacement of the first resilient ring, causing an inner surface of the first resilient rings to fit to the outer surface of the adapting tube. The adapter clamp also includes a second resilient ring placed in the inner circumferential surface of the adapter tube and comprising of elastic material for inward expanding and clamping to the outer surface of the adapting tube; and a spacer placed on the inner circumferential surface of the adapter tube for keeping the first resilient ring and the second resilient ring apart at a predetermined distance.

The adapter clamp may include various shapes of the resilient ring. For example, the resilient ring may have a square, rectangular, circular, L-Shape, or T-shape cross section to perform the clamping result from the longitudinal compression displacement.

BRIEF DESCRIPTION OF THE DRAWINGS

These and other features, aspects and advantages of the present invention will be more fully understood when considered with respect to the accompanying drawings, wherein:

FIG. 3B is an enlarged side and cross-section view during the insertion and removal stage, according to one embodiment of the present invention

FIG. 4C depicts a resilient rubber ring in an elongated state, according to one embodiment of the present invention;

DETAILED DESCRIPTION

A self-centering adapter clamp according to the present invention provides effective mounting and accurate auto-centering function without additional threads requirement from the adapting tube. The adapter clamp can accurately center-seal to accommodate adapting surfaces with small imperfections, such as dents, scratches, or manufacturing diameter tolerances. The adapter can be widely used in many applications where a device requires precision adapting such as gun-sight barrel adapter, telescope eyepiece focuser adapter, detachable fishing rod, quick release hook, and the like.

In one embodiment, the present invention is a self centering clamp adapter for use in a tube set up, for example, in a telescope eyepiece focuser draw tube. The adaptor includes a resilient rubber ring that expands radially inward to receive an adapting tube to friction-clamp the outer diameter of the adapting tube. This way, the rubber ring automatically positions the receiving tube to the same center axis of the adapting tube at the final clamping position.

Figure 1:
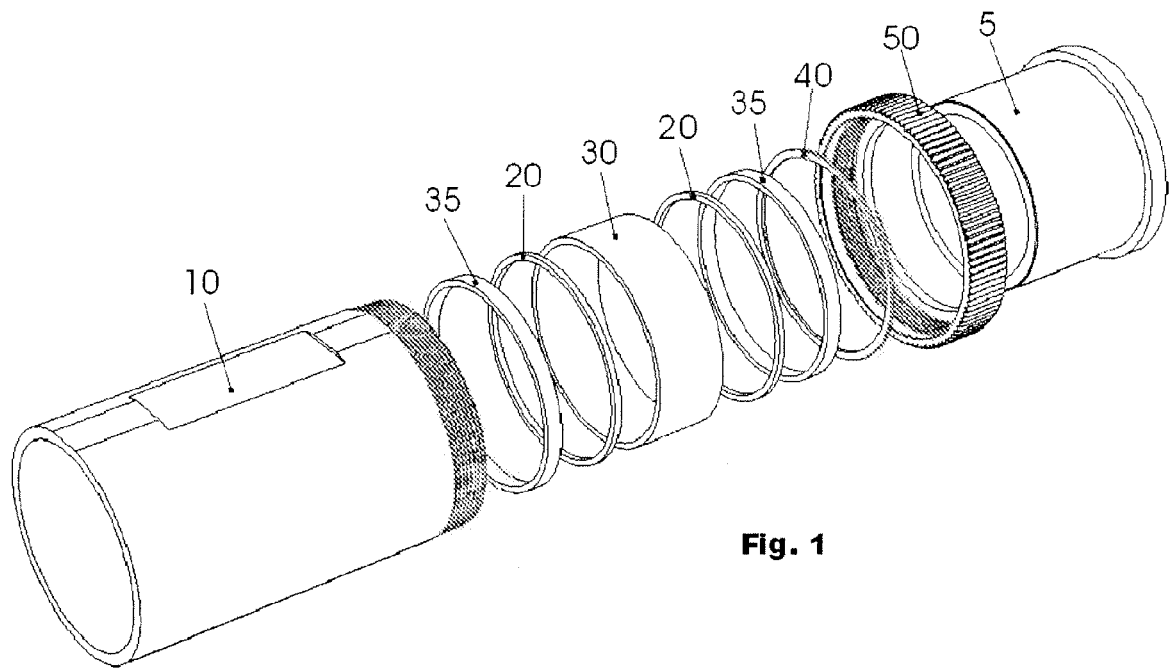
FIG. 1 is a perspective view of a self-centering adapter clamp components, according to one embodiment of the present invention.
Figure 2:
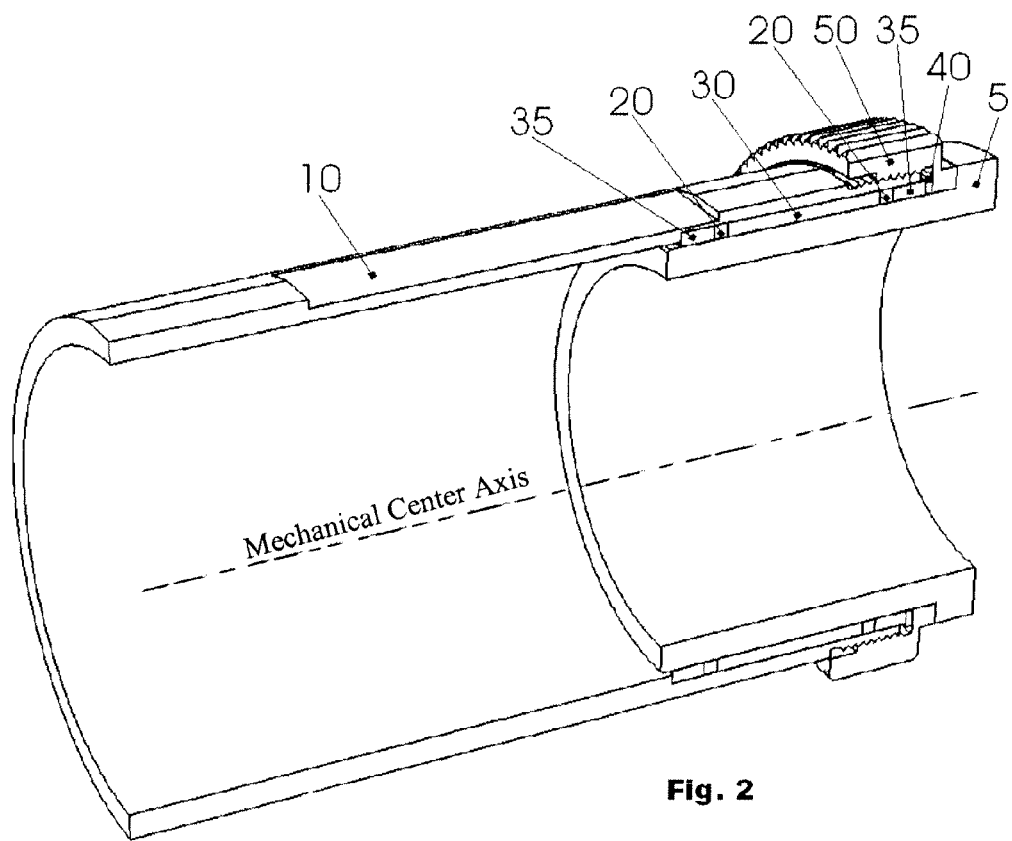
FIG. 2 is a perspective cross section view of an assembled adapter clamp, according to one embodiment of the present invention.

FIG. 1 is a perspective view of self-centering adapter clamp components and FIG. 2 is a cross-section perspective view of the assembled adapter clamp with inserted adapting tube, according to one embodiment of the present invention.

As shown in FIGS. 1 and 2, an adapter clamp 1 includes six parts, an adapter tube 10, two or more resilient rings 20 (two shown), a spacer 30, two support rings 35, a compression ring 40, and an adjustment ring 50. The adapter tube 10 essentially provides the structural integrity of the adapter to allow all the components to function along its center axis. The resilient ring(s) 20 provide a key adapting mechanism when compressed. The spacer 30 keeps the two resilient rubber rings 20 apart at a designated distance to have at least two secure supporting points alone the clamping distance which keeps the adapting tube from pivoting after it is fully clamped. And the two short spacers 35 provide additional compression support between the compressing ring 40 and the adapter tube 10 for the resilient rings.

The compression ring 40, using materials with a less friction characteristic (e.g., nylon), serves as a smooth interface translating the rotational threading force from the adjustment ring 51 to the longitudinal compressing displacement of the resilient rings 20. In one embodiment, a compression ring 40 is included to evenly auto-center the adapting tube 5. Since the rotation of the adjustment 50 ring may create unnecessary shear force on the resilient rings 20 if contact directly, thus cause uneven compression on the resilient rings 20 and fail to evenly expand inward radially to auto-center the adapting tube 5.

In one embodiment, the resilient ring 20 is a rubber O-ring (for example, a square-shaped rubber ring) which resides in the inner circumference of the adapter tube 10. The substantially square shape allows the resilient rings 20 to change its inner diameter according to the inserting tube's 5 outer diameter. Because the resilient ring 20 is constrained in the adapter clamp, it is only allowed to change its inner diameter. The resilient rings 20 are formed to provide at least two supporting points in the parallel direction to the clamping tube axis to prevent any pivoting. Here, the resilient ring 20 is referred to as "square-ring" simply because the edges are not round like a typical O-ring. Once compressed in the width direction, the inner surface of the resilient ring 20 serves to clamp to the outer wall of a inserting tube 5. The resilient ring 20 is shown in FIGS. 3A and 3B at a none-compressed state.

Figure 3A:
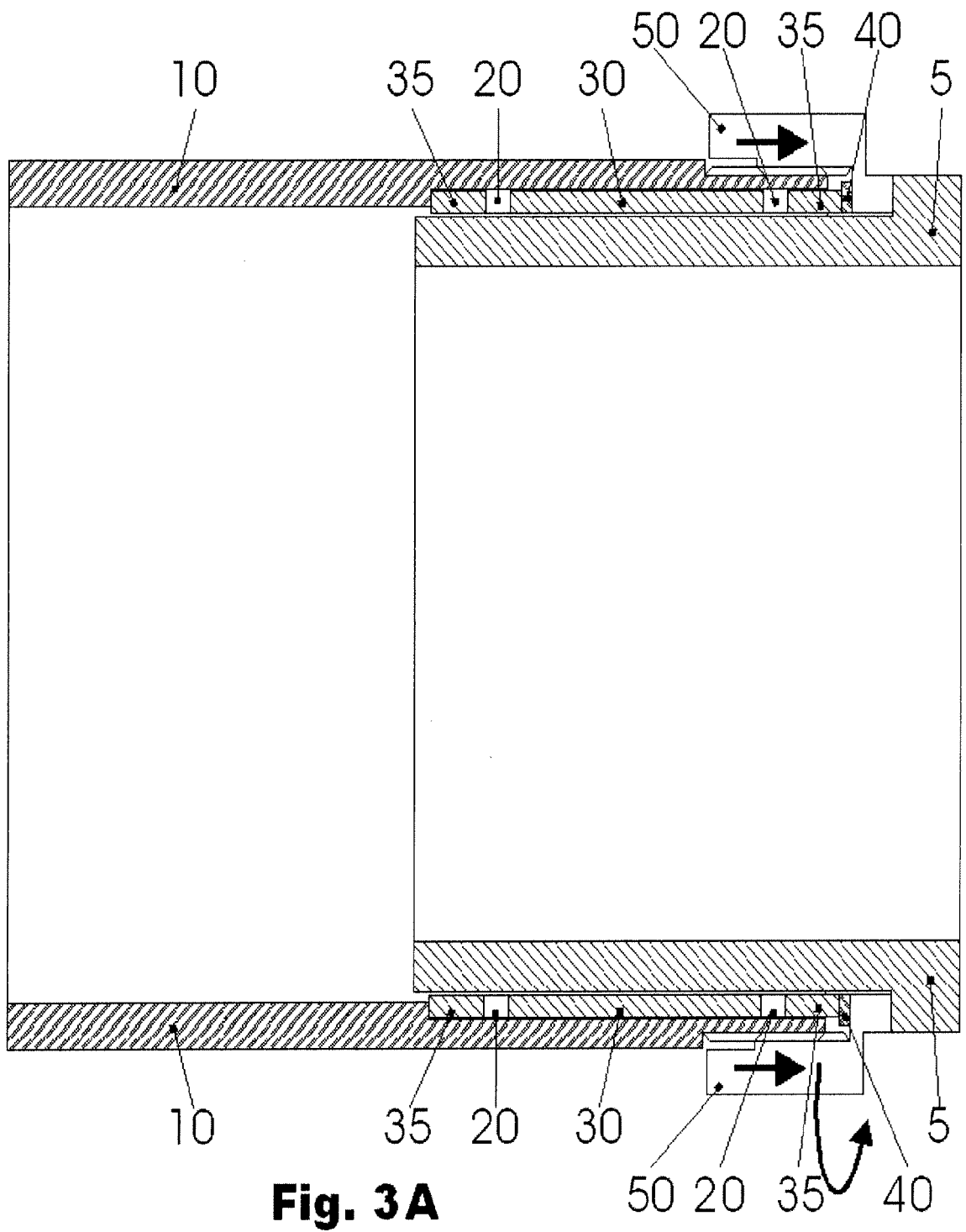
FIG. 3A is a side and cross-section view during insertion and removal stage, according to one embodiment of the present invention.
Figure 3C:
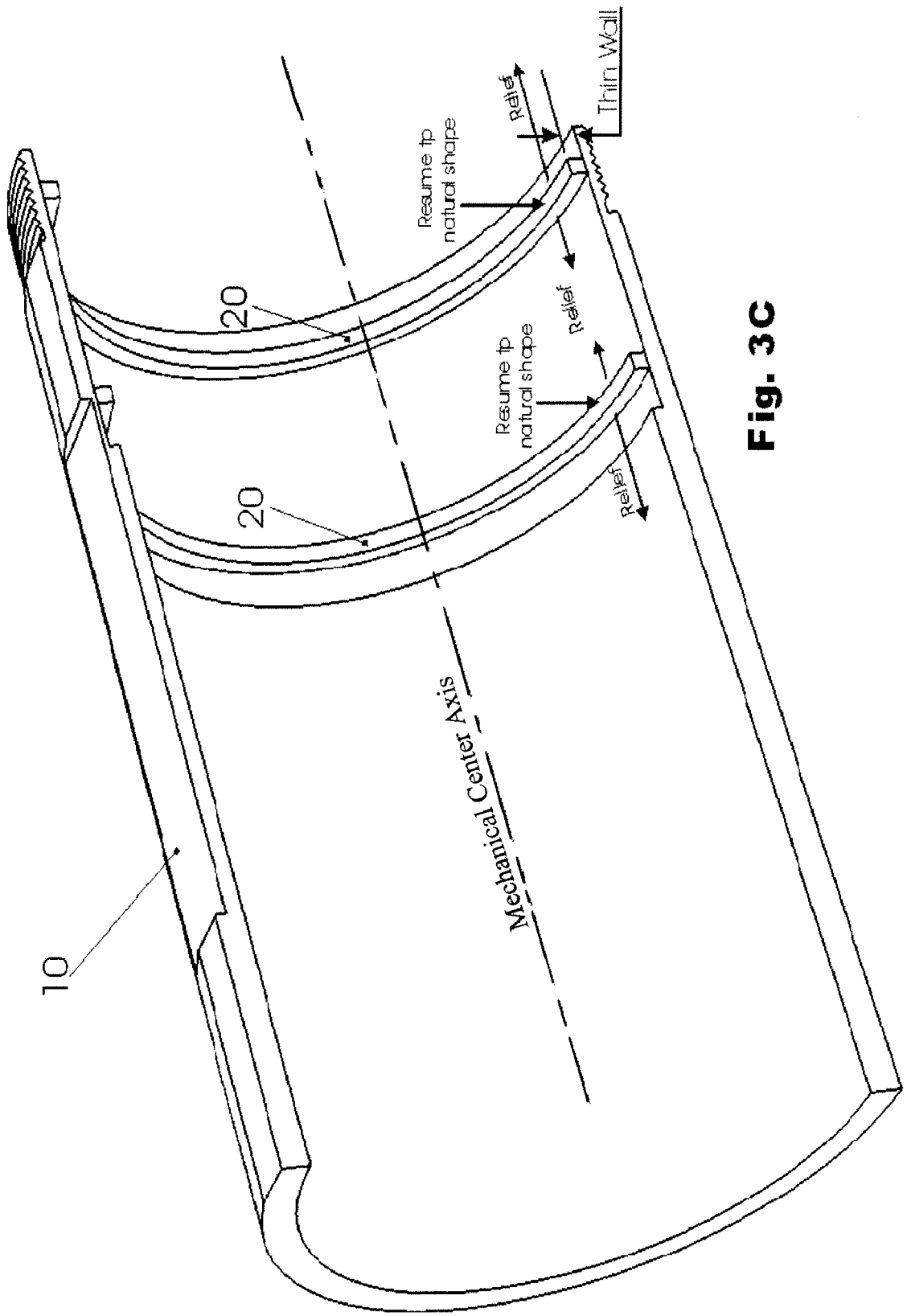
FIG. 3C depicts a resilient rubber ring in a normal state, according to one embodiment of the present invention.

FIG. 4C depicts the resilient rubber ring 20 in an elongated state as accepting the adapting tube 5 to friction clamp the outer diameter of the adapting tube 5 and FIG. 3C depicts the resilient ring 20 is a normal state, that is, when not compressed. The resilient ring 20 can be compressed, and resume back to its normal/natural non-compressed stage because of its memory effect. Although, the resilient rings 20 are sometimes referred to as rubber rings, they are not limited to rubber and can be made of any elastic type material.

FIG. 3A is a side and cross-section view during insertion and removal stage, and FIG. 3B is an enlarged side and cross-section view during the insertion and removal stage of the adapter to/from a clamping tube 5, according to one embodiment of the present invention. During the initial clamping and unloading stage, un-thread the adjustment ring 50 to relief longitudinal compression to the resilient rings 20. With the relief of the longitudinal compression, the resilient rings 20 resume to their natural stage at thinner wall, which results in slightly larger inside diameter. The natural (when not compressed) inside diameter of the resilient ring 20 allows the insertion of the adapting tube 5 freely.

Figure 4A:
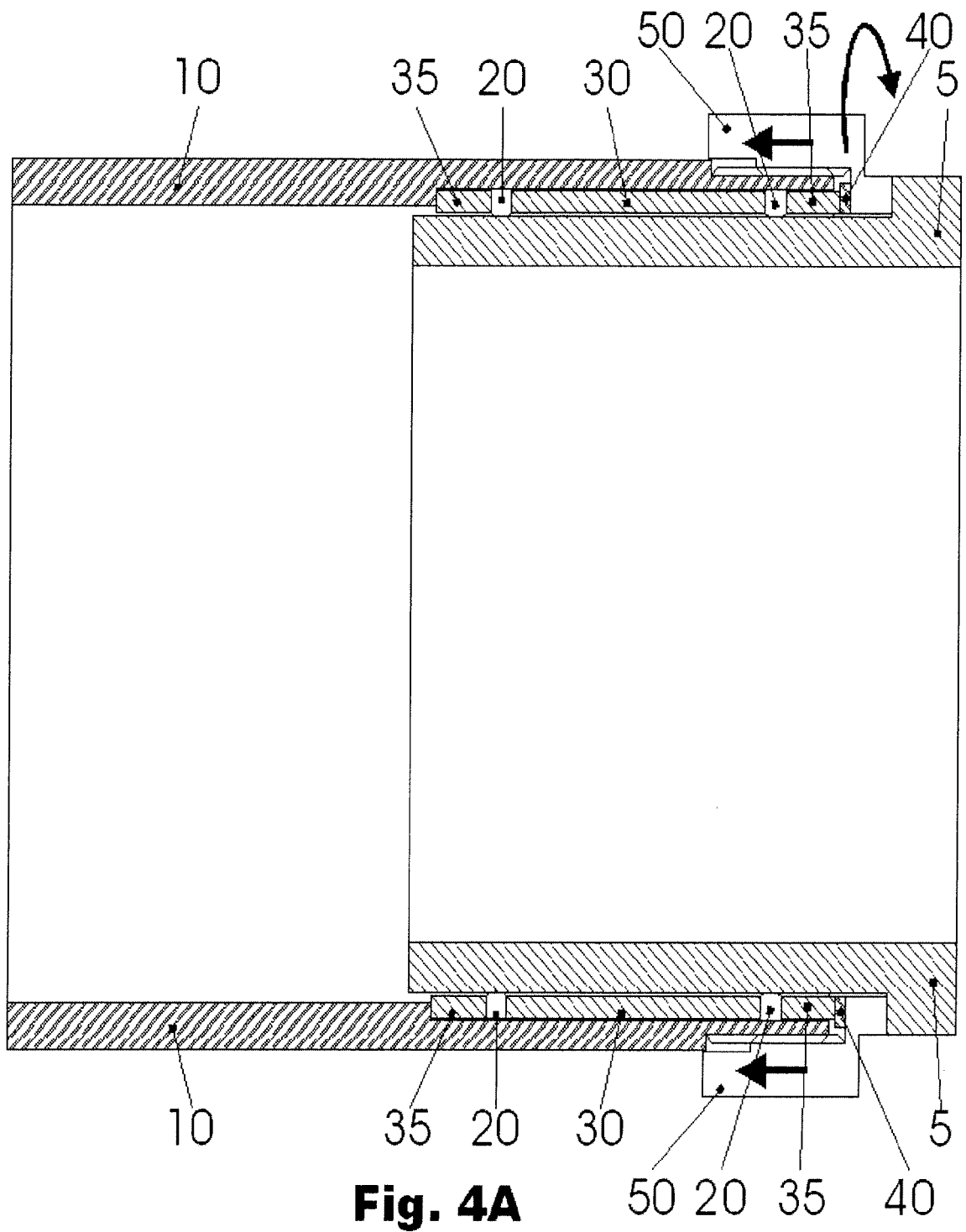
FIG. 4A is a side and cross-section views during clamping stage, according to one embodiment of the present invention.
Figure 4B:
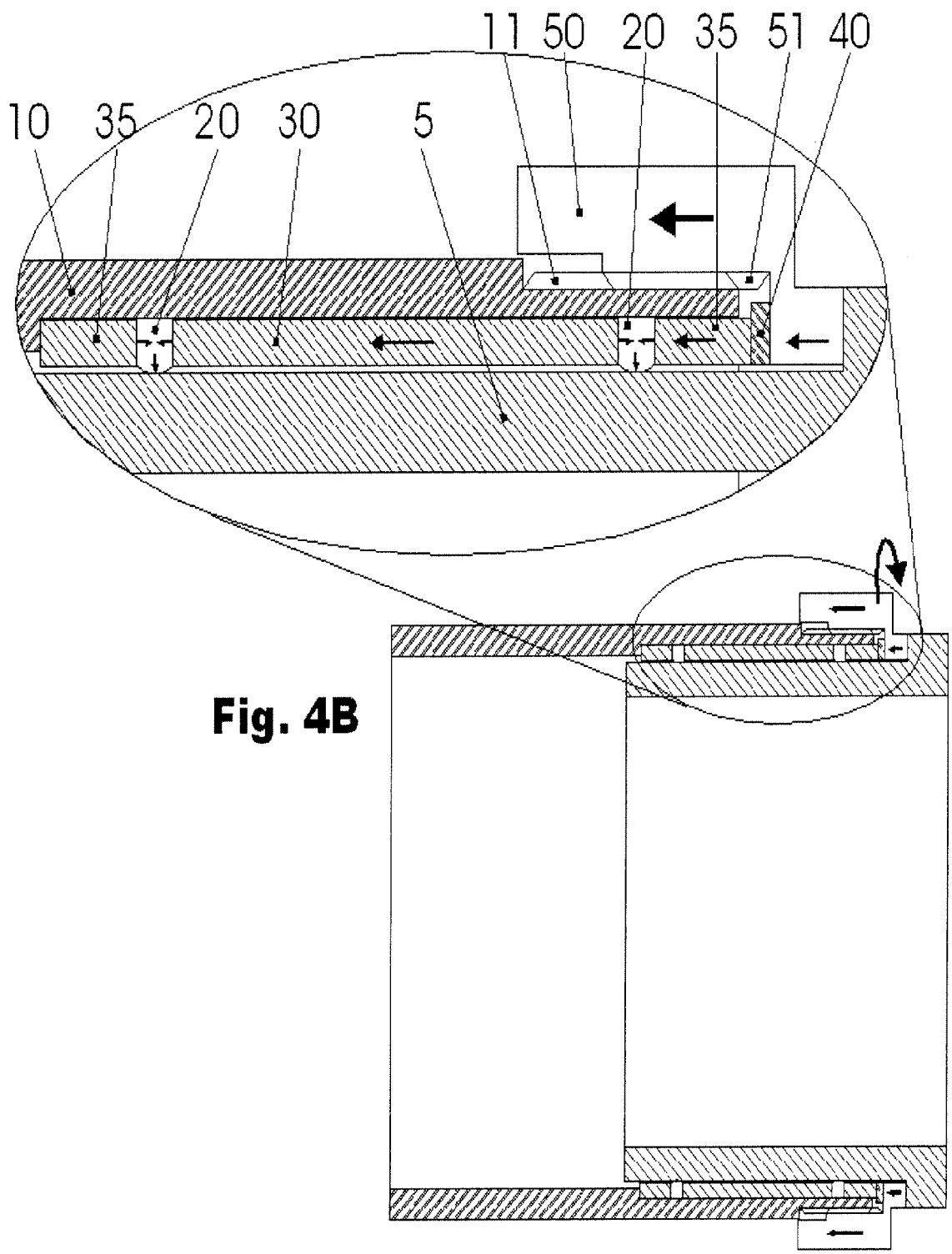
FIG. 4B is an enlarged side and cross-section views during the clamping stage, according to one embodiment of the present invention.

In FIG. 4A and FIG. 4B, when the constrained resilient ring 20 is compressed in the direction alone the adapter clamp's center axis, it can only be squeeze inward, that is, toward its center axis which decreases the inside diameter of the resilient ring 20, because its outer diameter is constrained within the clamping tube 10. In other words, the volume displacement of the resilient ring 20 in a restricted cavity is forced to flow toward the only open sided cavity, which is inward toward the center axis hence creating smaller inside diameter.

In one embodiment, the spacer 30, supporting rings 35, and the compression ring 40 move (in concert) forward or back alone the adapter's center axis, as the inserting tube 5 is inserted to the adapter, to decrease or increase the inside diameter of the resilient rings 20. The travel displacement of the spacer 30, supporting rings 35, and the compression ring 40 is pushed by the threading adjustment ring 50. In other words, the compression ring translates the displacement force with minimum friction resistant from the threading adjustment ring 50 to a longitudinal compressing displacement on to the first resilient ring 20, causing distortion of the resilient ring 20 such that the normal circular cross section of the resilient ring is flattened into an oval shape extending radially inward to press against the outer surface of the inserting tube 5 and clamp it in. The threading of the adjustment ring 51 decreases the inside diameter of the resilient rings 20 to accommodate the inserting tube's 5 outer diameter for an evenly internal surface friction clamp. The self centering adapter clamp mechanism may be installed in various adapting tubes, such as, a laser device, a water pipe, a telescope's focuser draw tube, or any other fitting tube (e.g., camera tripods, outdoor umbrella, and any other set up that requires two tube/rod-like structure to be adapted together.

FIG. 4A is a side and cross-section views during the locking stage, and FIG. 4B is an enlarged side and cross-section views during the locking stage, according to one embodiment of the present invention. As shown in FIG. 4A, once the adapting tube is fully inserted against an open adapter clamp, the user fastens the adjustment ring 50 to compress the resilient rings 20 forward. As shown in FIG. 4B, when resilient rings 20 are compressed in the longitudinal displacement direction, due to their physical characteristics, the contracting longitudinal displacement forces the resilient rings 20 to expand vertically to replace the equal compressed longitudinal volume displacement. This contraction results in an even decrease of resilient rings' 20 diameter to automatically nudge the inserted tube 5 to the center of the adapter and securely surface friction clamp the inserted tube 5 to the adapter clamp 10.

In one embodiment, the adapter clamp is sized to fit within most common telescope focuser draw tube openings such as reflective (Newtonian and SCT) and refractive telescope. In a preferred configuration, the adapter clamp has inside diameter opening of an approximately 1.25 inch, 2 inch, or 0.925 inch. This way, the adapter clamps the standard 1.25 inch, 2 inch, and 0.925 inch adapting eyepiece, camera, laser collimator, or any optical apparatus for most telescopes.

Figure 5A:
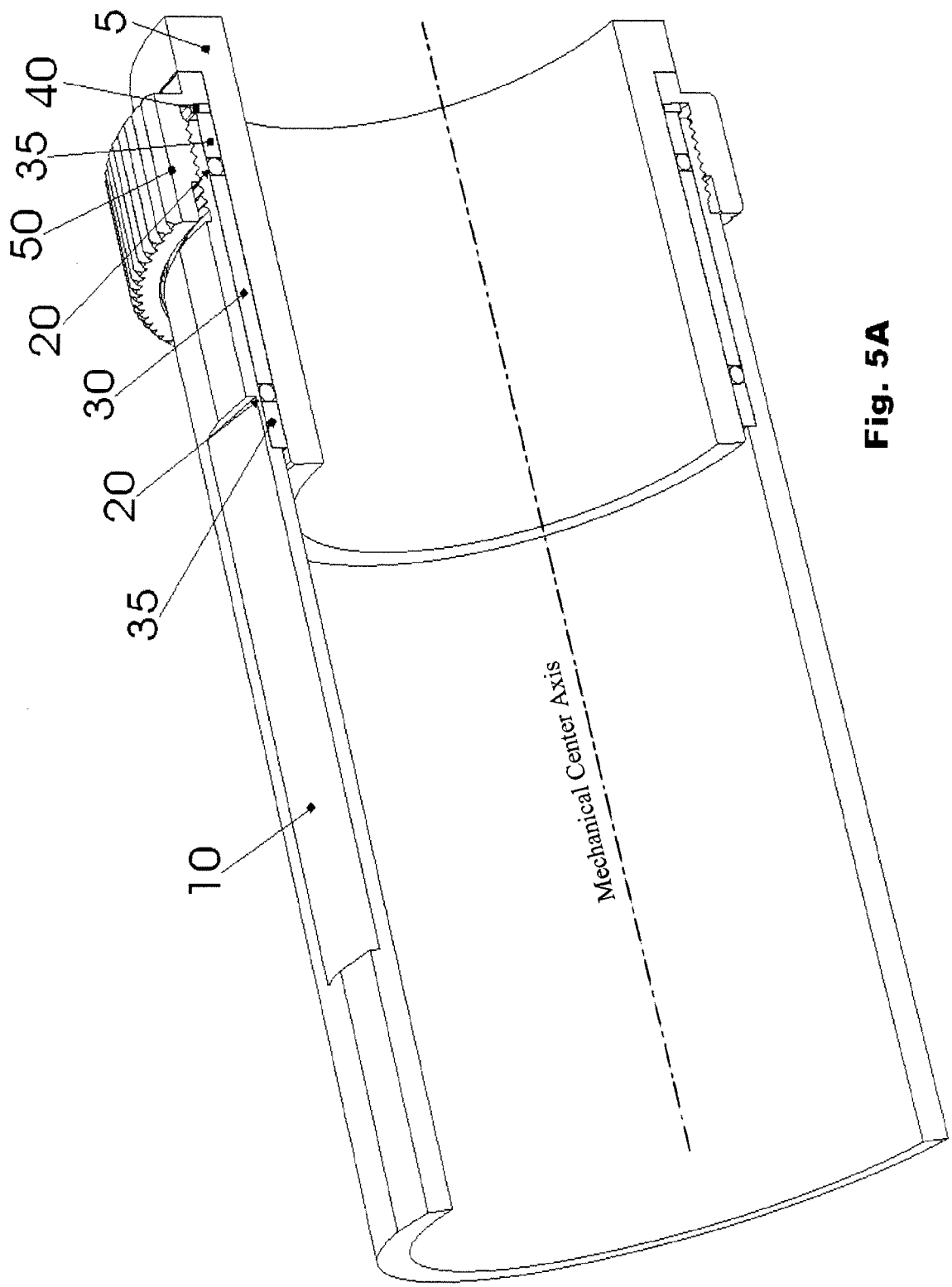
FIG. 5A is a cross-section view of an adapter clamp using a circular shape resilient ring, according to one embodiment of the present invention.
Figure 5B:
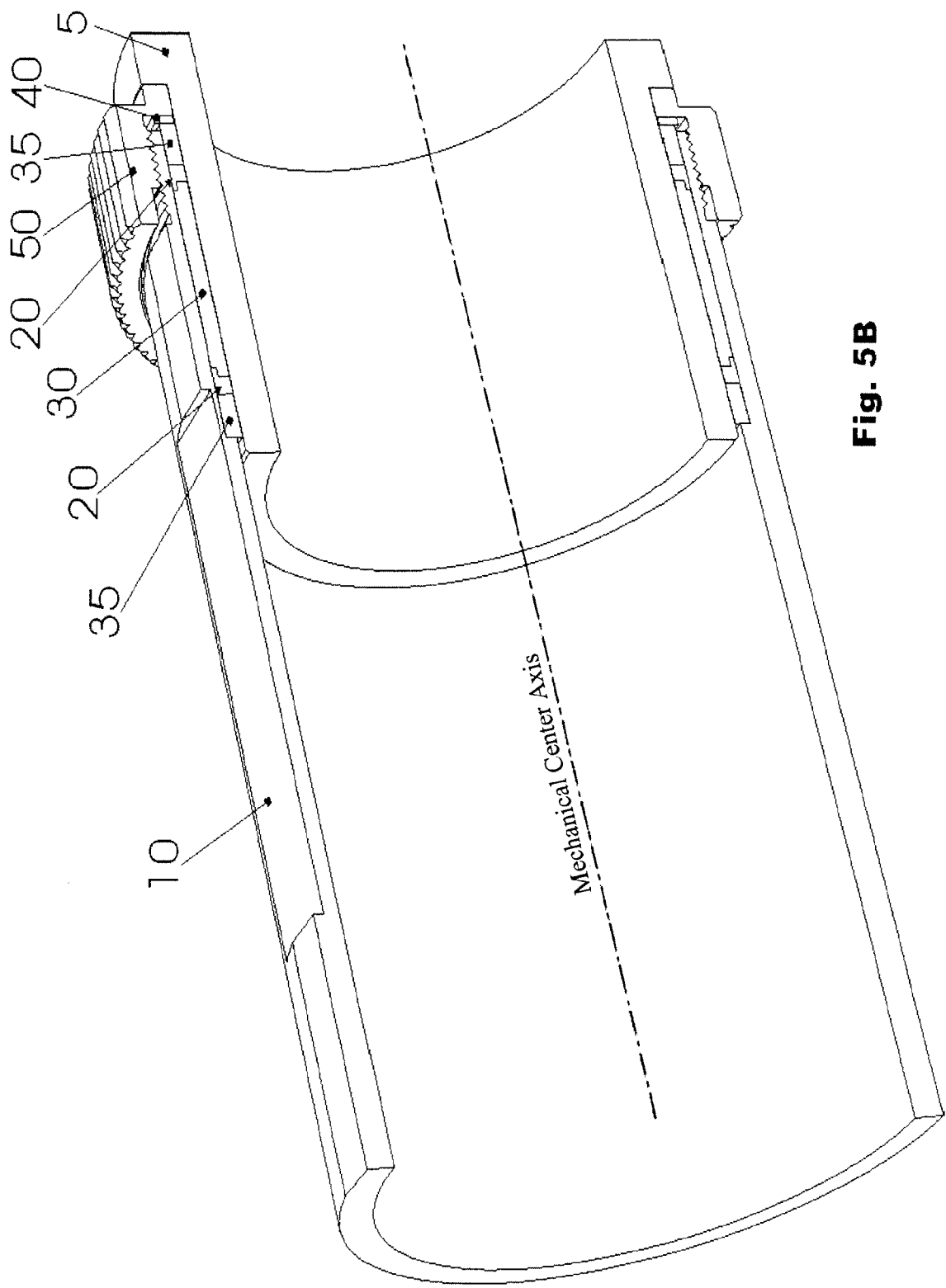
FIG. 5B is a cross-section view of an adapter clamp using an L-shape resilient ring, according to one embodiment of the present invention.
Figure 5C:
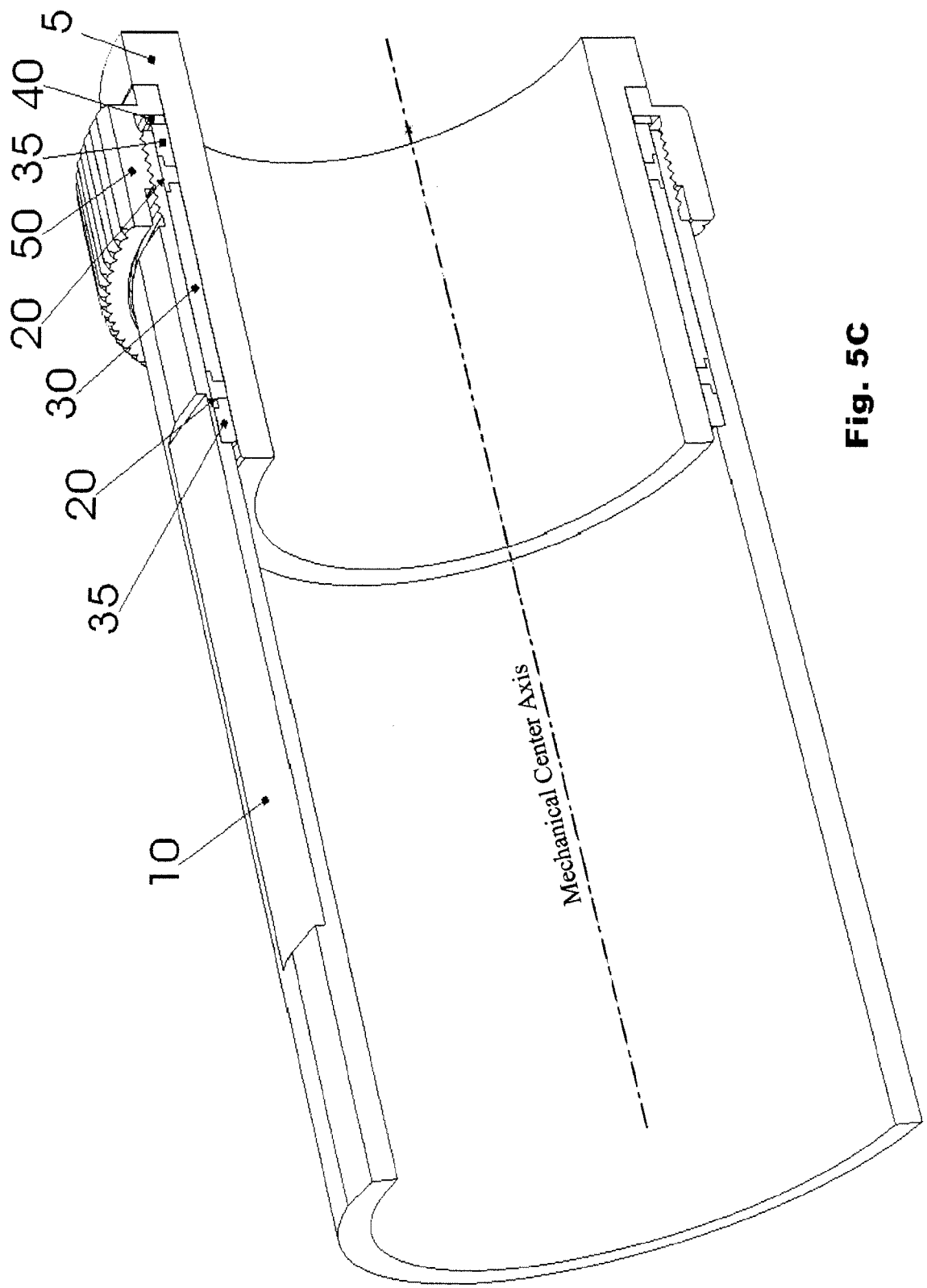
FIG. 5C is a cross-section view of an adapter clamp using a T-shape resilient ring, according to one embodiment of the present invention.

In one embodiment, the resilient ring 20 may have various cross section shapes such as, square, rectangular, circular FIG. 5A, L-Shape FIG. 5B, or T-shape FIG. 5C to perform the same clamping result from the longitudinal compression displacement. The various shapes prevent the resilient ring 20 from slipping off from the adapter 10 during free-load (no adapting tube is inserted) compression.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. An adapter clamp for clamping an adapting tube having an inner surface comprising:
   an adapter tube having an inner circumferential surface configured to clamp to an outer surface of the adapting tube;
   a first resilient ring placed in the inner circumferential surface of the adapter tube and including elastic material for expanding inward and clamping to an outer surface of the adapting tube;
   a hollow adjustment ring configured to be threaded to a circumferential surface of the adapter tube to generate a displacement force;
   a compression ring for translating the displacement force from the hollow adjustment ring to a longitudinal compressing displacement of the first resilient ring, causing an inner surface of the first resilient ring to fit to the outer surface of the adapting tube;
   a second resilient ring placed in the inner circumferential surface of the adapter tube and including elastic material for inward expanding and clamping to the outer surface of the adapting tube; and
   a spacer placed on the inner circumferential surface of the adapter tube for keeping the first resilient ring and the second resilient ring apart at a predetermined distance, wherein the adapting tube is a telescope eyepiece focuser draw tube.

2. The adapter clamp of claim 1, wherein the first and second resilient rings are made of rubber.

3. The adapter clamp of claim 1, wherein the first and second resilient rings are made of elastic material.

4. The adapter clamp of claim 1, wherein the first resilient ring has a square, cross section.

5. The adapter clamp of claim 1, wherein the first resilient ring has a rectangular cross section.

6. The adapter clamp of claim 1, wherein the first resilient ring has a circular cross section.

7. The adapter clamp of claim 1, wherein the first resilient ring has an L-Shape cross section.

8. The adapter clamp of claim 1, wherein the first resilient ring has a T-shape cross section.

9. The adapter clamp of claim 1, wherein the second resilient ring has a square, cross section.

10. The adapter clamp of claim 1, wherein the second resilient ring has a rectangular cross section.

11. The adapter clamp of claim 1, wherein the second resilient ring has a circular cross section.

12. The adapter clamp of claim 1, wherein the second resilient ring has an L-Shape cross section.

13. The adapter clamp of claim 1, wherein the second resilient ring has a T-shape cross section.

14. An adapter clamp for clamping an adapting tube having an inner surface comprising:
   an adapter tube having an inner circumferential surface configured to clamp to an outer surface of the adapting tube;
   a first resilient ring placed in the inner circumferential surface of the adapter tube and including elastic material for expanding inward and clamping to an the outer surface of the adapting tube;
   a hollow adjustment ring configured to be threaded to a circumferential surface of the adapter tube to generate a displacement force;
   a compression ring for translating the displacement force from the-hollow adjustment ring to a longitudinal compressing displacement of the first resilient ring, causing an inner surface of the first resilient ring to fit to the outer surface of the adapting tube;
   a second resilient ring placed in the inner circumferential surface of the adapter tube and including elastic material for inward expanding and clamping to the outer surface of the adapting tube; and
   a spacer placed on the inner circumferential surface of the adapter tube for keeping the first resilient ring and the second resilient ring apart at a predetermined distance, wherein the adapting tube is a gun-sight barrel adapter.

15. The adapter clamp of claim 14, wherein the first and second resilient rings are made of rubber.

16. The adapter clamp of claim 14, wherein the first and second resilient rings are made of elastic material.

17. The adapter clamp of claim 14, wherein the first resilient ring has a square, cross section.

18. The adapter clamp of claim 14, wherein the first resilient ring has a rectangular cross section.

19. The adapter clamp of claim 14, wherein the first resilient ring has a circular cross section.

20. The adapter clamp of claim 14, wherein the first resilient ring has an L-Shape cross section.

* * * * *